(12) United States Patent
Bedwell

(10) Patent No.: US 8,130,594 B2
(45) Date of Patent: Mar. 6, 2012

(54) MECHANICALLY FILTERED HYDROPHONE

(75) Inventor: Ian Bedwell, Rydalmere (AU)

(73) Assignees: Thales Underwater Systems Pty Limited, Rydalmere (AU); The Commonwealth of Australia, Canberra, Act (AU)

(*) Notice: Subject to any disclaimer, the term of this patent is extended or adjusted under 35 U.S.C. 154(b) by 452 days.

(21) Appl. No.: 12/086,734

(22) PCT Filed: Dec. 16, 2006

(86) PCT No.: PCT/AU2006/001922
§ 371 (c)(1),
(2), (4) Date: May 11, 2009

(87) PCT Pub. No.: WO2007/070933
PCT Pub. Date: Jun. 28, 2007

(65) Prior Publication Data
US 2010/0260013 A1    Oct. 14, 2010

(30) Foreign Application Priority Data
Dec. 21, 2005    (AU) ................ 2005907210

(51) Int. Cl.
*G01H 9/00* (2006.01)
(52) U.S. Cl. ................ 367/149; 367/172
(58) Field of Classification Search ........... 367/149, 367/172
See application file for complete search history.

(56) References Cited

U.S. PATENT DOCUMENTS

| | | | |
|---|---|---|---|
| 4,519,252 A | | 5/1985 | McMahon |
| 4,751,690 A | * | 6/1988 | Krueger ............ 367/149 |
| 5,671,191 A | | 9/1997 | Gerdt |
| 6,134,185 A | | 10/2000 | Goldner et al. |
| 6,160,762 A | | 12/2000 | Luscombe et al. |
| 6,879,546 B2 | | 4/2005 | Halvorsen et al. |
| 6,882,595 B2 | | 4/2005 | Woo |
| 7,028,543 B2 | | 4/2006 | Hardage et al. |
| 7,082,079 B2 | | 7/2006 | Woo |
| 7,345,953 B2 | | 3/2008 | Crickmore et al. |
| 7,969,823 B2 | * | 6/2011 | Bedwell ............ 367/149 |
| 2009/0135673 A1 | * | 5/2009 | Bedwell ............ 367/149 |
| 2010/0260013 A1 | * | 10/2010 | Bedwell ............ 367/149 |

FOREIGN PATENT DOCUMENTS

| | | |
|---|---|---|
| GB | 2 397 885 A | 8/2004 |
| JP | 11 064153 A | 3/1999 |
| WO | WO 2004/042425 A1 | 5/2004 |
| WO | WO 2007/056827 A1 | 5/2007 |

* cited by examiner

*Primary Examiner* — Daniel Pihulic
(74) *Attorney, Agent, or Firm* — Marshall & Melhorn, LLC

(57) ABSTRACT

A hydrophone (10) for immersion in a liquid body defining a depth-dependent static pressure and a dynamic pressure. The hydrophone (10) includes a pressure-bearing element (11) for exposure to the liquid body; a motion sensor (13) spaced apart from the pressure bearing element (11); and a dilatant coupling material (14) disposed intermediate the pressure-bearing element (11) and the motion sensor (13) so as to mechanically transmit movements substantially corresponding to the dynamic pressure from the pressure-bearing element (11) to the motion sensor (13). The dilatant coupling material (14) does not transmit movements to the motion sensor (13) that substantially correspond to the depth-dependent static pressure.

17 Claims, 2 Drawing Sheets

MECHANICALLY FILTERED HYDROPHONE

FIELD OF THE INVENTION

The present invention relates to pressure sensors. In a particular form the invention relates to an improved hydrophone for underwater acoustic sensing and the like. The invention has been developed to provide hydrophones that are deployable into the ocean as part of a pressure sensing arrangement, and will be described hereinafter with reference to this application. However it will be appreciated that the invention is not limited to this particular field of use.

BACKGROUND OF THE INVENTION

Known hydrophone arrangements used in remote sensing applications, such as in sea bed arrays and underwater arrays, for example, typically make use of piezoelectric devices that require local active instrumentation. This renders these prior art arrangements more susceptible to detection by unauthorised parties. They also have data and power cabling and pre-amp requirements that make such prior art hydrophone arrays bulky, difficult to deploy and maintenance intensive.

In an attempt to address these issues hydrophones based on fibre optic technology have been developed. However it has been appreciated by the present inventor that the prior art fibre optic-based hydrophones typically offer reduced quality of performance when deployed at depth due to a lack of depth pressure compensation. For example, the acoustic signal that is to be detected by the fibre laser sensor is typically a small pressure wave that will be referred to herein as "dynamic pressure". By way of non-limiting example, a typical dynamic pressure wave has an amplitude of up to around 100 Pa and is in a frequency range of between approximately 10 Hz and 20 kHz. At depth the device is additionally subject to a hydrostatic pressure that will be referred to herein as "static pressure". In the ocean this static pressure typically increases by approximately 100,000 Pa for every 10 m of depth. Hence, at depth, the static pressure is typically many orders of magnitude larger than the dynamic pressure. This can cause a hydrophone or sensor system to saturate and become deaf to the significantly smaller dynamic pressure and consequently the desired sound signal is not detected. It also necessitates the usage of excessive optical bandwidth to transmit the resultant signal along an optical fibre cable.

It is an object of the present invention to overcome or ameliorate at least one of the disadvantages of the prior art, or to provide a useful alternative.

SUMMARY OF THE INVENTION

According to a first aspect of the invention there is provided a hydrophone for immersion in a liquid body defining a depth-dependent static pressure and a dynamic pressure, said hydrophone including:

a pressure-bearing element for exposure to said liquid body;

a motion sensor spaced apart from said pressure bearing element; and a dilatant coupling material disposed intermediate said pressure-bearing element and said motion sensor so as to mechanically transmit movements substantially corresponding to said dynamic pressure from said pressure-bearing element to said motion sensor, said dilatant coupling material not transmitting movements to said motion sensor that substantially correspond to said depth-dependent static pressure.

Preferably, the dilatant coupling material has a mechanical strain frequency dependent viscosity profile. More preferably the frequency dependent viscosity profile defines an effective cut off frequency below which the coupling material exhibits low viscosity and above which the coupling material exhibits high viscosity.

In one preferred embodiment the pressure-bearing element is a membrane, whereas in another preferred embodiment the pressure-bearing element is a housing.

In one preferred embodiment the motion sensor is a piezoelectric sensing ceramic. In yet another preferred embodiment the motion sensor includes a fibre optic cable having a laser active region defining an emitted wavelength varying in accordance with a mechanical strain acting on the laser active region. In this preferred embodiment the fibre optic cable is mounted upon a bendable member disposed for intimate contact with the coupling material such that movements transmitted by the coupling material are communicated to the bendable member so as to exert a mechanical strain on the laser active region. Preferably the bendable member is disposed upon a pair of spaced apart feet so as to maximise bending of the bendable member at a pre-defined portion of the bendable member intermediate the feet. The laser active region is preferably disposed at, or proximate to, said pre-defined portion of the bendable member.

In another preferred embodiment the coupling material is contained within a chamber that is at least partially resiliently deformable. Preferably the chamber is defined by at least the following components:

The membrane;

The bendable member disposed opposite said membrane; and

At least one resiliently deformable sidewall extending between the membrane and the bendable member.

According to another aspect of the invention there is provided a fibre laser hydrophone for immersion in a liquid body defining a depth-dependent static pressure and a dynamic pressure, said hydrophone including:

a first elongate bendable beam adapted to bend in response to said depth-dependent static pressure and said dynamic pressure;

a second elongate bendable beam disposed adjacent to, and spaced apart from, said first beam;

a dilatant coupling material disposed intermediate said first beam and said second beam so as to mechanically transmit movements substantially corresponding to said dynamic pressure from said first beam to said second beam, said coupling material not transmitting movements substantially corresponding to said depth-dependent static pressure; and a fibre optic cable disposed on said second beam, said fibre optic cable having a laser active region defining an emitted wavelength varying in accordance with a mechanical strain acting on said laser active region, said laser active region being subject to mechanical strain arising from movement of said second elongate bendable beam.

Preferably first elongate bendable beam is disposed within a housing and an exterior of the housing is exposable to the liquid body.

In a preferred embodiment the first elongate bendable beam includes a plurality of projections for engagement with one or more internal surfaces of the housing so as to mechanically transmit movements to the first elongate bendable beam that substantially correspond with the depth-dependent static pressure and the dynamic pressure. In this preferred embodiment a plurality of pieces of the dilatant coupling material are disposed respectively adjacent the plurality of projections.

BRIEF DESCRIPTION OF THE DRAWINGS

Preferred embodiments of the invention will now be described, by way of example only, with reference to the accompanying drawings, in which.

DETAILED DESCRIPTION OF THE INVENTION

Figure 1:
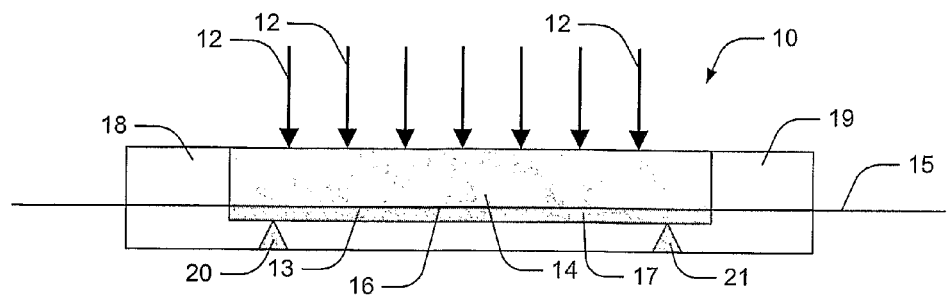
FIG. 1 is a side view of a first embodiment of the invention.

Referring to the drawings, the first embodiment of the hydrophone 10 as illustrated in FIG. 1 is adapted for immersion in a liquid body, which is typically the ocean. In usage the hydrophone 10 is subject to the pressure exerted by the liquid body, which typically consists of a depth-dependent static pressure and a dynamic pressure. As noted above, at depth the static pressure is typically many orders of magnitude greater than the dynamic pressure, however it is the dynamic pressure that is usually required to be sensed by the hydrophone. The pressure is diagrammatically represented as impacting upon the hydrophones in FIGS. 1 and 4 by arrows 12 and 41 respectively.

The hydrophone 10 includes a pressure-bearing element 11 for exposure to the liquid body. In the embodiment illustrated in FIG. 1, the pressure-bearing element 11 is in the form of a membrane. A motion sensor 13 is spaced apart from the pressure bearing element 11, and a dilatant coupling material 14 is disposed intermediate the pressure-bearing element 11 and the motion sensor 13. The dilatant coupling material 14 functions to mechanically transmit only certain pre-defined types of movements from pressure bearing element 11 to the motion sensor 13. More particularly, the movements that are transmitted are those substantially corresponding to the dynamic pressure. However, the dilatant coupling material 14 does not transmit movements to the motion sensor 13 that substantially correspond to the depth-dependent static pressure. This effectively provides depth compensation of the hydrophone by isolating the motion sensor 13 from movements associated with the static component of the pressure.

The above-mentioned selective mechanical transmission of movement is achieved by virtue of a mechanical strain frequency dependent viscosity profile as exhibited by the dilatant coupling material 14. The viscosity profile varies to an extent that the material exhibits both fluid and solid attributes; that is, the coupling material 14 is viscoelastic. The frequency dependent viscosity profile defines an effective cut-off frequency below which the coupling material 14 exhibits low viscosity and above which the coupling material 14 exhibits high viscosity. In the preferred embodiment, this cut-off frequency is approximately 1 Hz. In other words, in response to mechanical strains at a frequency lower than 1 Hz, the coupling material 14 behaves in a manner akin to a liquid, thereby not mechanically transmitting movement. However, in response to mechanical strains at a frequency higher than approximately 1 Hz, the coupling material 14 behaves in a manner akin to a solid, thereby mechanically transmitting movement.

An example of a suitable dilatant coupling material is 3179 Dilatant Compound, as marketed at the time of drafting of this specification by Dow Corning®. This compound is also known by the trade name Silly Putty™. According to information published by Dow Corning®, this material has the following composition:

| Component | Weight Percentage |
|---|---|
| PDMS | 65% |
| Silica | 17% |
| Thixotrol | 9% |
| Boric Acid | 4% |
| Glycerine | 1% |
| Titanium Oxide | 1% |
| Dimethyl Cyclosiloxane | 1% |

In some embodiments (not illustrated) the motion sensor 13 is a piezoelectric sensing ceramic. As well known to those skilled in the art, piezoelectric sensing ceramics provide an output voltage that varies in a known manner relative to an applied mechanical pressure. Hence, in such embodiments, the piezoelectric sensing ceramic is disposed in intimate contact with the coupling material 14 such that its voltage output is dependent upon the mechanical pressure exerted by the coupling material 14.

In the illustrated embodiments, the motion sensor 13 includes a fibre optic cable 15 having a laser active region 16 defining an emitted wavelength varying in accordance with a mechanical strain acting on the laser active region 16. More particularly, the laser active region 16 includes a central active cavity and Bragg grating elements disposed on opposed sides of the cavity. When pumping radiation of, for example, 980 nm is transmitted into the laser active region 16, a reflected optical signal is emitted having a wavelength that varies in accordance with a mechanical strain acting on the laser active region 16. Further information regarding such an arrangement is provided in co-pending PCT Application No. PCT/AU2006/001742, the contents of which are hereby incorporated in their entirety by way of reference.

The fibre optic cable 15 is mounted upon a bendable member 17, both of which are disposed in intimate contact with the coupling material 14. This ensures that movements (which may be in the form of pressure waves) as transmitted by the coupling material 14 are communicated to the bendable member 17. This, in turn, exerts a mechanical strain on the laser active region 16, thereby varying the frequency of the reflected optical signal. This reflected optical signal is then received and the frequency variation is analysed to provide an indication of the dynamic pressure field acting upon the pressure-bearing element 11.

The bendable member 17 is disposed upon a pair of spaced apart feet 20 and 21 so as to maximise bending of the bendable member 17 at a pre-defined portion of the bendable member 17 which is intermediate the feet 20 and 21. More particularly, the pre-defined portion of the bendable member 17 is the mid-point of the beam, which is disposed in the middle of the two feet 20 and 21. The laser active region 16 is disposed at or proximate to the pre-defined portion of the bendable member. Hence, the portion of the fibre optic cable 15 that is most reactive to mechanical strain (i.e. the laser active region 16) is disposed upon the portion of the bendable beam 17 that experiences the greatest bending resulting from movements transmitted from the pressure-bearing element 11, via the coupling material 14, to the bendable member 17. This enhances the sensitivity of the motion sensor 13.

The dilatant coupling material 14 is contained within an at least partially resiliently deformable chamber. That is, as best shown in FIG. 1, the chamber is defined by the following components:

The membrane 11;

The bendable member 17 disposed opposite the membrane 11; and

Two resiliently deformable sidewalls 18 and 19 extending between the membrane 11 and the bendable member 17.

This chamber contains the dilatant coupling material 14. Otherwise, if the coupling material 14 were not contained, it would slowly flow away from its desired configuration. The resiliently deformable sidewalls allow for bulging of the coupling material 14 in situations where the coupling material 14 is reacting to a high static pressure. That is, the resiliency of at least part of the chamber ensures that the coupling material 14 is not hydrostatically constrained from dissipating the static pressure. The resiliency biases the bulging coupling material 14 towards its desired configuration, which is shown in FIG. 1.

As shown in FIG. 1, the dilatant coupling material 14 has a length equal to the length of the bendable member 17. However, in other embodiments these lengths differ. In particular, in another embodiment (not illustrated) the length of the coupling material 14 is approximately 80% of the length between the feet 20 and 21. In such an embodiment the lengths of the resiliently deformable sidewalls 18 and 19 are increased accordingly.

Figure 2:
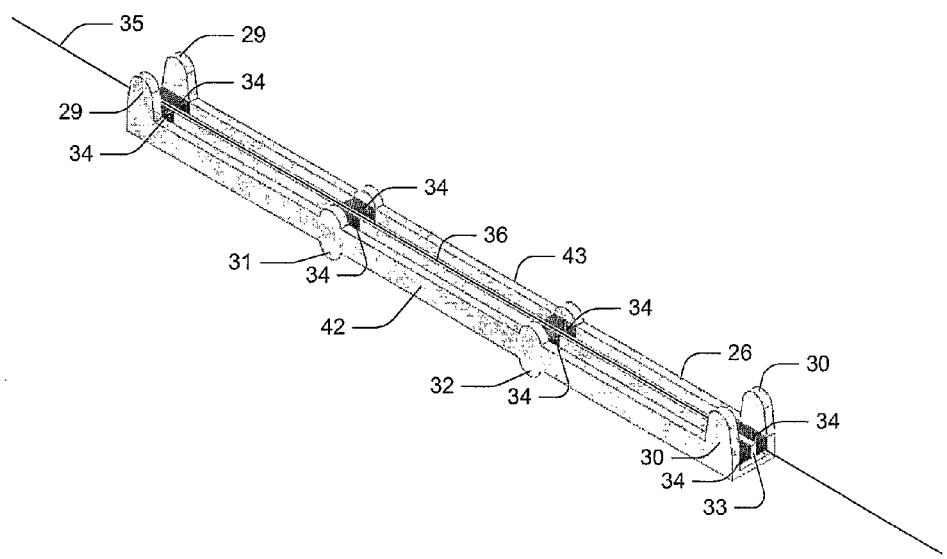
FIG. 2 is a perspective view of a double-beam used in a second embodiment of the invention.
Figure 3:
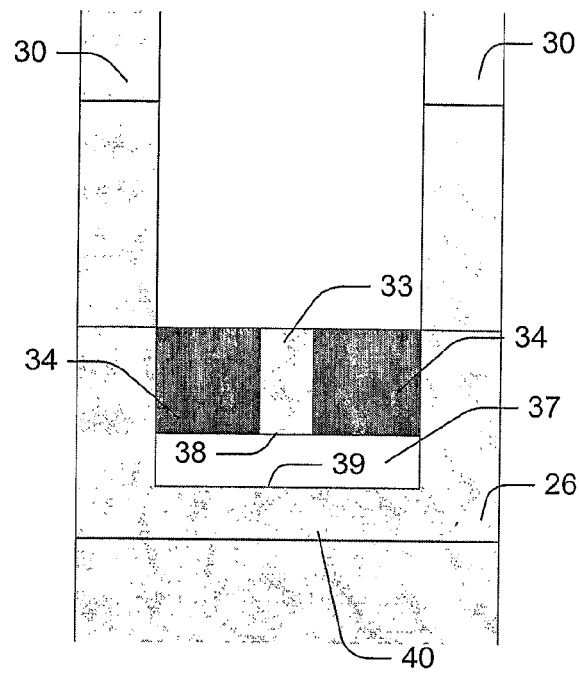
FIG. 3 is an end view of the double-beam shown in FIG. 2.
Figure 4:
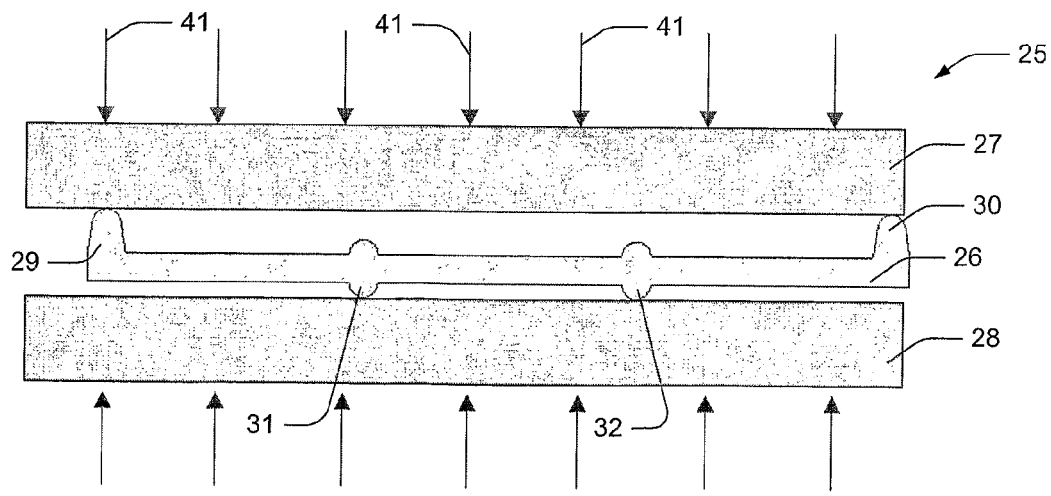
FIG. 4 is a side view of the second embodiment of the invention.

Components of a second embodiment of a hydrophone 25 are illustrated in FIGS. 2 to 4. This fibre laser hydrophone 22 includes a first elongate bendable beam 26 adapted to bend in response to the pressure as exerted by the liquid body in which it is immersed. As shown in FIG. 4, the first bendable beam 26 is disposed within a housing consisting of first and second housing components 27 and 28 respectively. The static and dynamic pressures of the liquid body are exerted upon the exterior surfaces of the housing components 27 and 28, as illustrated by the arrows 41 of FIG. 4.

The first elongate bendable beam 26 includes first and second projections 29 and 30 respectively disposed at each opposed end of the beam 26. These projections 29 and 30 extend towards the first housing component 27 for engagement with the internal surface of this housing component 27. This mechanically transmits movements from the first housing component 27 to the first elongate bendable beam 26 that substantially correspond with the depth-dependent static pressure and the dynamic pressure. The first elongate bendable beam 26 also includes third and fourth projections 31 and 32 disposed intermediate the ends of the beam 26. These projections 31 and 32 extend towards the second housing component 28 for engagement with the internal surface of this housing component 28. This mechanically transmits movements from the second housing component 28 to the first elongate bendable beam 26 that substantially correspond with the depth-dependent static pressure and the dynamic pressure. The axial displacement of the third and fourth projections 31 and 32 relative to the first and second projections, 29 and 30 ensures that the first beam bends in response to a compressive force exerted from the housing onto the projections 20 to 32. When the compressive force is removed, the first beam 26 straightens out due to its inherent resiliency.

The second embodiment of the hydrophone 25 also includes a second elongate bendable beam 33 disposed adjacent to, and spaced apart from, the first beam 26. More particularly, as best shown in FIG. 3, the first beam 26 has a U-shaped cross section, with the second beam 33 being centrally disposed within the U-shape. As best shown in FIG. 2, the first and second projections 29 to 32 in this embodiment of the first beam 26 are actually mated pairs of projections. For each mated pair, one of the projections is disposed on a first side 42 of the first beam 26, with the other projection being disposed directly opposite its mate on the second side 43 of the first beam 26. The U-shaped arrangement advantageously provides a symmetry that minimises or avoids twisting of the first beam 26, thereby helping to ensure that all bending movements of the first beam 26 are faithfully responsive to the pressure waves as communicated from the housing components 27 and 28.

In the second embodiment 25, dilatant coupling material 34 is disposed intermediate the first beam 26 and the second beam 33. More particularly, as best shown in FIG. 3, the coupling material 34 is disposed on either side of the second beam 33, in each case extending between a sidewall of the second beam 33 and an interior sidewall of the U-shaped first beam 26. As best shown in FIG. 2, eight separate pieces of the dilatant coupling material 34 are disposed respectively adjacent each of the projections 29 to 32. Each piece of coupling material 34 is approximately 1 mm in thickness. That is, the separation distance between the inner sidewalls of the U-shaped first beam 26 and the sidewalls of the second beam 33 is approximately 1 mm. Although not shown in the figures, in some preferred embodiments the dilatant coupling material 34 is contained within thin hollow pieces of resiliently deformable tubing, each piece having a diameter of approximately 1 mm.

As previously described with regard to the first embodiment, the dilatant coupling material 34 only mechanically transmits movements having a frequency of greater than approximately 1 Hz. Hence, the static pressure is mechanically substantially filtered-out, leaving only movements substantially corresponding with the dynamic pressure to be transmitted from the first beam 26 to the second beam 33. This effectively depth-compensates the hydrophone 25.

A fibre optic cable 35 is disposed on the second beam 33 so as to bend in conjunction with bending movements of the second beam 33. As previously described in relation to the first embodiment, the fibre optic cable 35 has a laser active region 36 defining an emitted wavelength varying in accordance with a mechanical strain acting on the laser active region 36. The laser active region 36 is subject to mechanical strain arising from bending movement of the second beam 33. For heightened sensitivity, the laser active region 36 is centred about the mid-point of the second beam 33, which is generally the point at which bending movements of the second beam 33 exhibit their greatest amplitude.

As best shown in FIG. 3, a clearance gap 37 is provided between the base 38 of the second beam 33 and the upper surface 39 of the base 40 of the U-shaped first beam 26. This clearance gap 37 is required because exposure to static pressure imparts a bend upon the first beam 26 that is not transmitted to the second beam 33 due to the dilatant coupling material 34. It will be appreciated by those skilled in the art that the clearance gap 37 must be sufficiently large so as to ensure that the base 38 of the second beam 33 does not foul against the upper surface 39 of the base 40 of the first beam 26 when the hydrophone 25 is immersed in the liquid body at the maximum operational depth to which the hydrophone 25 may be deployed.

Although the invention has been described with reference to specific examples, it will be appreciated by those skilled in the art that the invention may be embodied in many other forms.

The invention claimed is:

1. A hydrophone for immersion in a liquid body defining a depth-dependent static pressure and a dynamic pressure, said hydrophone comprising:
 a pressure-bearing element for exposure to said liquid body;
 a motion sensor spaced apart from said pressure bearing element; and
 a dilatant coupling material disposed intermediate said pressure-bearing element and said motion sensor so as to mechanically transmit movements substantially corresponding to said dynamic pressure from said pressure-bearing element to said motion sensor, said dilatant coupling material not transmitting movements to said motion sensor that substantially correspond to said depth-dependent static pressure.

2. A hydrophone according to claim 1 wherein said dilatant coupling material has a mechanical strain frequency dependent viscosity profile.

3. A hydrophone according to claim 2 wherein said frequency dependent viscosity profile defines an effective cut-off frequency below which said coupling material exhibits low viscosity and above which said coupling material exhibits high viscosity.

4. A hydrophone according to claim 1 wherein said coupling material is contained within an at least partially resiliently deformable chamber.

5. A hydrophone according to claim 1 wherein said pressure-bearing element is a membrane.

6. A hydrophone according to claim 1 wherein said motion sensor is a piezoelectric sensing ceramic.

7. A hydrophone according to claim 1 wherein said motion sensor includes a fibre optic cable having a laser active region defining an emitted wavelength varying in accordance with a mechanical strain acting on said laser active region.

8. A hydrophone according to claim 7 wherein said fibre optic cable is mounted upon a bendable member disposed for intimate contact with said coupling material such that movements transmitted by said coupling material are communicated to said bendable member so as to exert a mechanical strain on said laser active region.

9. A hydrophone according to claim 4 wherein said chamber is defined by at least the following components:
 said pressure-bearing element;
 said bendable member disposed opposite said membrane; and
 at least one resiliently deformable sidewall extending between said membrane and said bendable member.

10. A hydrophone according to claim 8 wherein said chamber is defined by at least the following components:
 said pressure-bearing element;
 said bendable member disposed opposite said membrane; and
 at least one resiliently deformable sidewall extending between said membrane and said bendable member.

11. A hydrophone according to claim 8 wherein said bendable member is disposed upon a pair of spaced apart feet so as to maximise bending of the bendable member at a pre-defined portion of the bendable member intermediate said feet.

12. A hydrophone according to claim 11 wherein said laser active region is disposed at or proximate to said pre-defined portion of the bendable member.

13. A fibre laser hydrophone for immersion in a liquid body defining a depth-dependent static pressure and a dynamic pressure, said hydrophone comprising:
 a first elongate bendable beam adapted to bend in response to said depth-dependent static pressure and said dynamic pressure;
 a second elongate bendable beam disposed adjacent to, and spaced apart from, said first beam;
 a dilatant coupling material disposed intermediate said first beam and said second beam so as to mechanically transmit movements substantially corresponding to said dynamic pressure from said first beam to said second beam, said coupling material not transmitting movements substantially corresponding to said depth-dependent static pressure; and
 a fibre optic cable disposed on said second beam, said fibre optic cable having a laser active region defining an emitted wavelength varying in accordance with a mechanical strain acting on said laser active region, said laser active region being subject to mechanical strain arising from movement of said second elongate bendable beam.

14. A hydrophone according to claim 13 wherein said first elongate bendable beam is disposed within a housing.

15. A hydrophone according to claim 14 wherein an exterior of said housing is exposable to said liquid body.

16. A hydrophone according to claim 14 wherein said first elongate bendable beam includes a plurality of projections for engagement with one or more internal surfaces of said housing so as to mechanically transmit movements to said first elongate bendable beam that substantially correspond with said depth-dependent static pressure and said dynamic pressure.

17. A hydrophone according to claim 16 wherein a plurality of pieces of said dilatant coupling material are disposed respectively adjacent said plurality of projections.

* * * * *

UNITED STATES PATENT AND TRADEMARK OFFICE
CERTIFICATE OF CORRECTION

PATENT NO. : 8,130,594 B2
APPLICATION NO. : 12/086734
DATED : March 6, 2012
INVENTOR(S) : Ian Bedwell Page 1 of 1

It is certified that error appears in the above-identified patent and that said Letters Patent is hereby corrected as shown below:

Title page: Item [22] PCT Filed: replace "Dec. 16, 2006" with --Dec. 18, 2006--.

Signed and Sealed this
Fifth Day of February, 2013

Teresa Stanek Rea
*Acting Director of the United States Patent and Trademark Office*